United States Patent Office 3,078,059
Patented Feb. 19, 1963

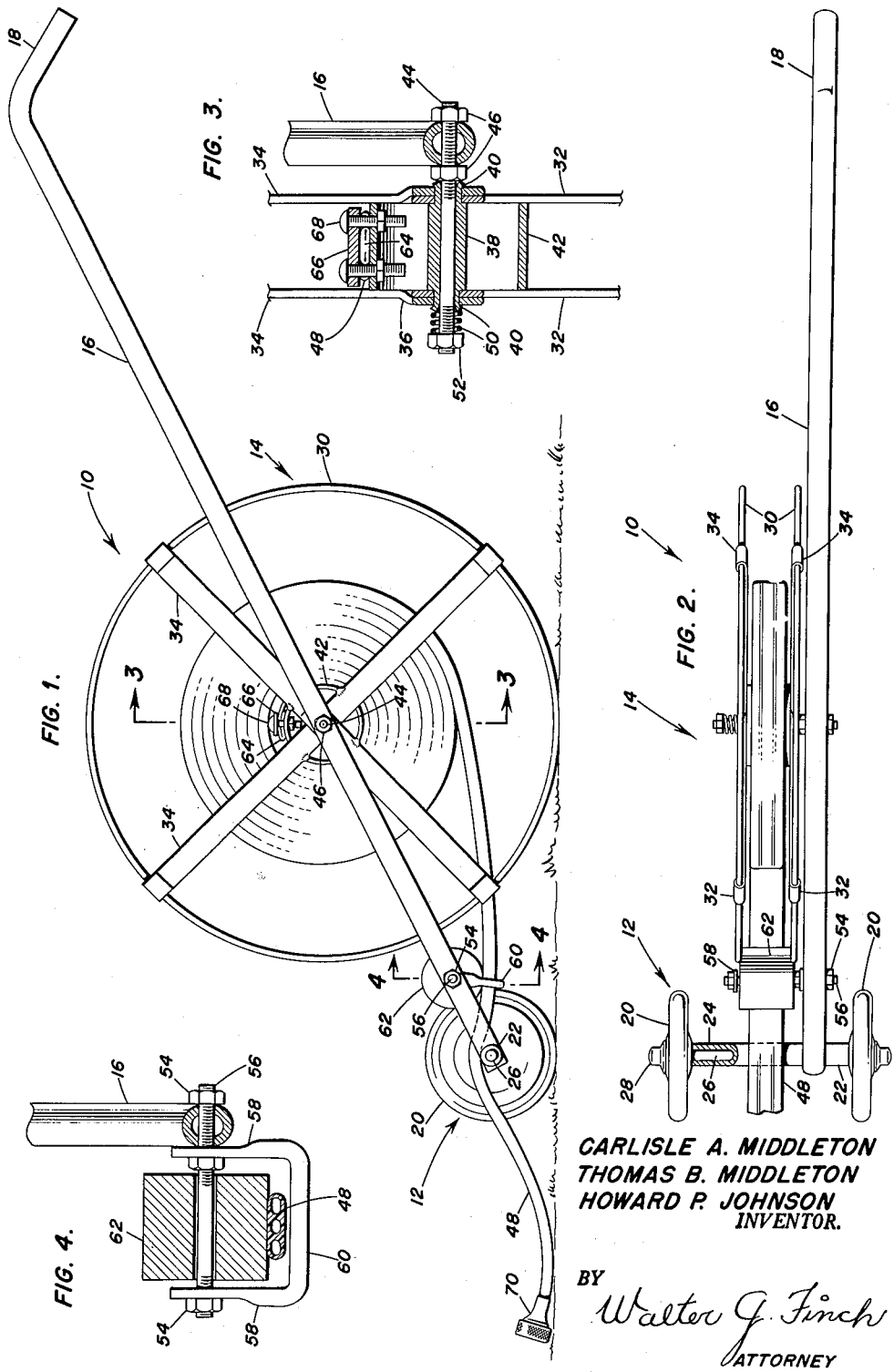

3,078,059
SPRINKLER HOSE REEL CART
Howard P. Johnson, 1901 Fairbank Road, Baltimore 9, Md.; Carlisle A. Middleton, 38 Dungarrie Road, Baltimore, Md.; and Thomas B. Middleton, 4940 Rodman St. NW., Washington, D.C.
Filed Mar. 28, 1960, Ser. No. 17,933
3 Claims. (Cl. 242—86.3)

This invention relates generally to garden tools, and more particularly it pertains to a hose reel for storing or paying-out garden hoses of the flat perforated sprinkler variety.

It is an object of this invention to provide a new design of a garden hose reel.

Still another object of this invention is to provide a hose reel for storing as well as paying-out garden hoses of the flat perforated sprinkler variety.

Even still another object of this invention is to provide a new type of hose reel for garden hoses which is is economical to manufacture, efficient and reliable in operational use, and which is easy to assemble and disassemble for maintenance thereof.

Still even another object of this invention is to provide a novel garden hose reel which is easy to manipulate and handle, and which is compact and of light weight construction. These objects and other objects and advantages of this invention will become more readily apparent from the following detailed specification and accompanying drawings wherein:

FIG. 1 is a side elevation of a garden hose reel incorporating features of the present invention shown with the nearest of a pair of small wheels having been omitted for purposes of clarity;

FIG. 2 is a top plan view of the garden hose reel with a portion of one of the elements broken away;

FIG. 3 is a cross-section of the garden hose reel, on an enlarged scale, taken on line 3—3 of FIG. 1; and FIG. 4 is a cross-section of a portion of the garden hose reel, on an enlarged scale, taken on line 4—4 of FIG. 1.

Referring now to FIGS. 1 and 2 of the drawings, there is shown a hand propelled reel 10, consisting generally of a two wheeled dolly 12 and a storage reel assembly 14. The dolly 12 consists of a tubular member 16, the upper end of which is bent to form a handle 18 and the lower end of which is provided with a pair of wheels 20. It should be noted in FIG. 1 that the wheel 20 nearest the viewer has been omitted in order to more fully disclose certain details which will be described subsequently.

The wheels 20 of the dolly 12 are maintained in an unsymmetrical arrangement with respect to the tubular member 16 by means of a pair of unequal length spacer bushings 22 and 24 which enclose a one-piece axle 26. Axle 26 passes through a suitable aperture provided in the lower end of the tubular member 16. The wheels are secured to the axle 26 in a suitable fashion as by hub caps 28.

The reel 14 is fashioned from a pair of spaced heavy wire or rod hoops 30, each of which is provided with a pair of spokes 32 and 34. The ends of spokes 32 and 34 are wrapped and crimped around the hoops 30. Spoke 34 is formed with a joggle 36 where it crosses spoke 32 in order that both spokes 32 and 34 might lie in a common plane.

As best illustrated in FIG. 3, the hoop and spoke assemblies are secured together in a spaced relationship by a shouldered hollow bushing 38. The ends 40 of the bushing 38 pass through close-fitting holes in the spokes 32 and 34, at the intersection of the spokes 32 and 34, after which the ends 40 thereof are flared.

Simultaneously with the assembly of bushing 38 to the spokes 32 and 34, and prior to flaring the ends 40 of the bushing 38, a short cylinder or open-ended drum 42 is installed around bushing 38 and welded to the spokes 32 and 34. The drum 42 and bushing 38 share a common axis. The reel 14 is journaled on a stub shaft 44 which is secured at one end by nuts 46 to the tubular member 16.

In order to prevent inadvertent uncoiling of a hose 48 which is stored on the reel 14, the rotational freedom of reel 14 on shaft 44 is purposely limited by means of a drag spring 50 whose tension can readily be adjusted by means of a nut 52.

Between reel 14 and wheels 20, there is secured to tubular member 16 by nuts 54, a second stub shaft 56 which passes between legs 58 of a yoke 60. Shaft 56 carries a free turning roller 62 which cooperates with yoke 60 to prevent hose 48 from twisting when it is being paid-out for use or reeled in for storage.

The design of flat sprinkler hoses, such as hose 48, is such as to require that they are placed flat on the ground in order to achieve a maximum area coverage to each side of the hose. A twisted hose 48 will direct almost all of its water to one side and will cover only a very limited area. It is equally important to avoid kinking of the hose 48 when storing the hose because the kinks will set and become difficult to remove until the hose is allowed to warm and soften in the sun.

In securing the hose 48 to reel 14, one end is folded double as at 64 and then firmly clamped to the drum 42 by a bar 66 which is held in place by screws 68.

To unreel the hose 48, it is only necessary to secure a conventional hose fitting 70 to a garden tap and then pull the invention to the right when viewing FIG. 1. To store the hose 48, the garden hose reel is pushed in the opposite direction.

Obviously many modifications and variations of the present invention are possible in light of the above teachings. It is, therefore, to be understood that within the scope of the appended claims the invention may be practiced otherwise than as specifically described.

What is claimed is:

1. A hand propelled hose reel device for reeling, and unreeling flat hose, comprising, a dolly having an axle and a pair of wheels mounted on the opposite ends thereof and having a pivotally mounted handle secured to said axle at one end, the other end of said handle extending outwardly from said dolly, a storage reel assembly mounted to said handle intermediate its ends, said storage reel assembly including a shaft having one end mounted on said handle, a drum positioned lengthwise of said shaft for receiving a hose to be stored on said drum as well as payed-out therefrom, a reel mounted on said shaft, said reel being formed of a plurality of spaced hoops, with each hoop having flat strap spokes radiating from said shaft and being clinched over their respective hoop, adjustable anchorage means for securing one end of said hose to said drum; together with roller means spaced parallel to and intermediate said axle and shaft and drum and rotatably secured to said handle and including an element for preventing twisting of said hose during the reeling up thereof as well as the unreeling thereof.

2. A hand propelled hose reel device for reeling and unreeling flat hose, comprising, a dolly having an axle and a pair of wheels mounted on the opposite ends thereof and having a pivotally mounted handle secured to said axle at one end, the other end of said handle extending outwardly from said dolly, a storage reel assembly mounted to said handle intermediate its ends, said storage reel assembly including a shaft having one end mounted on said handle, a drum positioned lengthwise of said shaft for receiving a hose to be stored on said drum as well as payed-out therefrom, a reel mounted on said shaft, said reel being formed of a plurality of spaced hoops, with each hoop having flat strap spokes radiating from said shaft and being clinched over their respective hoop, adjustable anchorage means for securing one end of said hose to said drum; together with roller means spaced parallel to and intermediate said axle and shaft and drum and rotatably secured to said handle and including an element for preventing twisting of said hose during reeling thereof consisting of a yoke secured to said handle and mechanically associated with said roller means.

3. A hand propelled hose reel device for reeling and unreeling flat hose, comprising, a dolly having an axle and a pair of wheels mounted on the opposite ends thereof and having a pivotally mounted handle secured to said axle at one end, the other end of said handle extending outwardly from said dolly, a storage reel assembly mounted to said handle intermediate its ends, said storage reel assembly including a shaft having one end mounted on said handle, a drum positioned lengthwise of said shaft for receiving a hose to be stored on said drum as well as payed-out therefrom, a reel mounted on said shaft, said reel being formed of a plurality of spaced hoops, with each hoop having flat strap spokes radiating from said shaft and being clinched over their respective hoop, adjustable anchorage means for securing one end of said hose to said drum; together with roller means spaced parallel to and intermediate said axle and shaft and drum and rotatably secured to said handle and including an element for preventing twisting of said hose during the reeling up thereof as well as the unreeling thereof, and means for limiting the rotational freedom of said reel for preventing inadvertent uncoiling of said hose.

References Cited in the file of this patent

UNITED STATES PATENTS

| | | |
|---|---|---|
| 233,990 | Crosby | Nov. 2, 1880 |
| 363,479 | Perkins | May 24, 1887 |
| 578,489 | Kessler | Mar. 9, 1897 |
| 1,480,769 | Leber | Jan. 15, 1924 |
| 1,883,518 | Branning | Oct. 18, 1932 |
| 2,214,315 | Adamson | Sept. 10, 1940 |
| 2,704,190 | Schmale et al. | Mar. 15, 1955 |
| 2,965,327 | Blary | Dec. 20, 1960 |

FOREIGN PATENTS

| | | |
|---|---|---|
| 159,022 | Australia | Sept. 24, 1954 |